(12) United States Patent
Hashimoto et al.

(10) Patent No.: US 11,550,619 B2
(45) Date of Patent: Jan. 10, 2023

(54) INFORMATION PROCESSING DEVICE AND PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Mikio Hashimoto, Tokyo (JP); Masami Aizawa, Yokohama Kanagawa (JP); Satoru Suzuki, Kawasaki Kanagawa (JP); Tsuneki Sasaki, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/465,194

(22) Filed: Sep. 2, 2021

(65) Prior Publication Data

US 2022/0091879 A1 Mar. 24, 2022

(30) Foreign Application Priority Data

Sep. 23, 2020 (JP) .............................. JP2020-158163

(51) Int. Cl.
*G06F 13/24* (2006.01)
*G06F 9/48* (2006.01)
*G06F 13/16* (2006.01)
*G06F 9/4401* (2018.01)

(52) U.S. Cl.
CPC .......... *G06F 9/4812* (2013.01); *G06F 9/4418* (2013.01); *G06F 13/1668* (2013.01); *G06F 13/24* (2013.01)

(58) Field of Classification Search
None
See application file for complete search history.

(56) References Cited

U.S. PATENT DOCUMENTS

| 6,742,113 B1 | 5/2004 | Yamada |
| 8,935,530 B2 | 1/2015 | Hashimoto et al. |
| 9,536,113 B2 | 1/2017 | Isozaki et al. |
| 9,860,218 B2 | 1/2018 | Koike et al. |

(Continued)

FOREIGN PATENT DOCUMENTS

| JP | H05-075845 U | 10/1993 |
| JP | 2000-339177 A | 12/2000 |

(Continued)

*Primary Examiner* — Hyun Nam
(74) *Attorney, Agent, or Firm* — Kim & Stewart LLP (57) ABSTRACT

According to one embodiment, an information processing device includes a processor, a controller, and a memory. The memory stores a vector address related to an interrupt request executed on condition that the processor is in a sleep state. The controller receives the interrupt request and detects that the processor transitions to the sleep state, detects fetch of the vector address of the interrupt request after the sleep state of the processor is detected, and inputs the vector address that is related to the interrupt request and stored in the memory into the processor in a case where the fetch of the vector address of the interrupt request is detected.

20 Claims, 5 Drawing Sheets

(56) References Cited

U.S. PATENT DOCUMENTS

| | | | |
|---|---|---|---|
| 2005/0060461 A1* | 3/2005 | Yang | G06F 13/24 |
| | | | 710/260 |
| 2009/0019267 A1* | 1/2009 | Ayyar | G06F 13/4081 |
| | | | 712/220 |
| 2016/0196153 A1* | 7/2016 | Ayyar | G06F 9/44505 |
| | | | 713/100 |
| 2017/0076102 A1 | 3/2017 | Ishihara et al. | |
| 2017/0212852 A1* | 7/2017 | Somu Kandaswamy | |
| | | | G06F 13/24 |
| 2018/0189205 A1* | 7/2018 | Davidescu | G06F 1/3243 |
| 2019/0018810 A1* | 1/2019 | Sparling | G06F 13/28 |
| 2019/0288709 A1* | 9/2019 | Lin | H03M 13/2906 |
| 2020/0264912 A1* | 8/2020 | Raisch | G06F 9/45545 |
| 2022/0091879 A1* | 3/2022 | Hashimoto | G06F 13/24 |

FOREIGN PATENT DOCUMENTS

| | | |
|---|---|---|
| JP | 2013-069053 A | 4/2013 |
| JP | 2013-101550 A | 5/2013 |
| JP | 2016-144040 A | 8/2016 |
| JP | 6129702 B2 | 5/2017 |
| JP | 2019-096338 A | 6/2019 |
| WO | 2013/069587 A1 | 5/2013 |

* cited by examiner

INFORMATION PROCESSING DEVICE AND PROCESSING METHOD

CROSS-REFERENCE TO RELATED APPLICATIONS

The present application claims the benefit of priority to Japanese Patent Application No. 2020-158163, filed on Sep. 23, 2020, the entire contents of which are incorporated herein by reference.

FIELD

Embodiments described herein relate generally to an information processing device and a processing method.

BACKGROUND

Conventionally, there has been a technology of storing address information of interrupt processing into a write-once logic circuit.

However, when addresses of all pieces of interrupt processing are stored into a write-once circuit, the addresses of the pieces of interrupt processing cannot be corrected. Also, when the addresses of all of the pieces of interrupt processing are stored, there is a risk for falsification of an address of a certain piece of interrupt processing. Thus, it is desired to make it possible to change an address of another piece of interrupt processing while securely executing a certain piece of interrupt processing.

DETAILED DESCRIPTION

According to the present embodiment, an information processing device includes a processor, a controller, and a memory. The memory stores a vector address related to an interrupt request executed on condition that the processor is in a sleep state. The controller receives the interrupt request and detects that the processor transitions to the sleep state, detects fetch of the vector address of the interrupt request after the sleep state of the processor is detected, and inputs the vector address that is related to the interrupt request and that is stored in the memory into the processor in a case where the fetch of the vector address of the interrupt request is detected.

In the following, a microcomputer and a processing method to which the information processing device according to the embodiment is applied will be described with reference to the accompanying drawings. Note that a device to which the information processing device according to the embodiment can be applied is not limited to the microcomputer. The information processing device according to the embodiment can be applied to an arbitrary device including a memory that stores a computer program, and a processor that executes the computer program. Note that the present invention is not limited to this embodiment.

Embodiment

Figure 1:
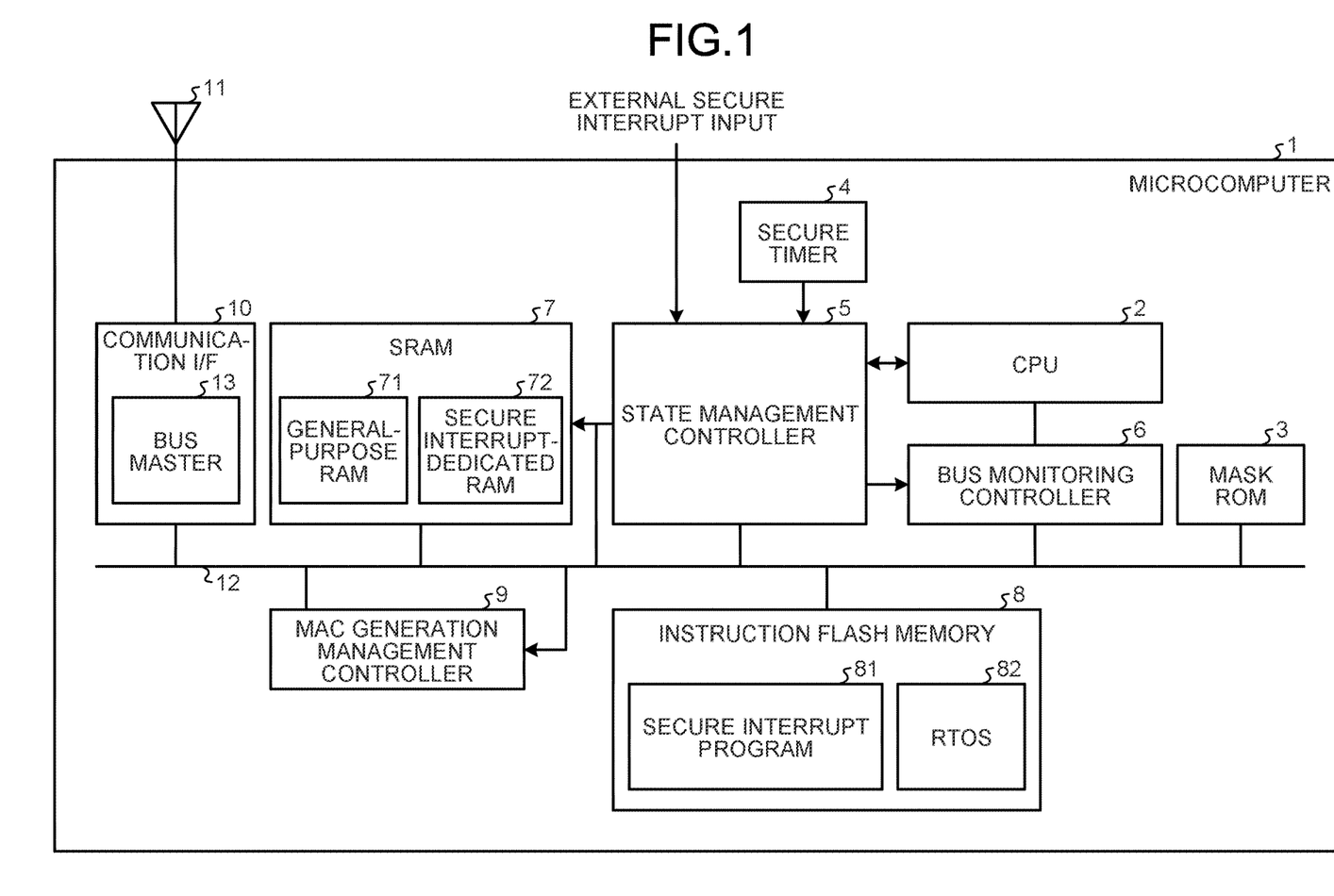
FIG. 1 is a schematic diagram illustrating an example of a hardware configuration of a microcomputer to which an information processing device according to an embodiment is applied.

FIG. 1 is a schematic diagram illustrating an example of a hardware configuration of a microcomputer to which an information processing device according to the embodiment is applied. A microcomputer 1 is connected to a server device via a communication interface (I/F) 10, for example. The microcomputer 1 is embedded in a sensor device or the like. The sensor device measures a concentration value of a specimen for a several seconds once in three minutes, for example. The microcomputer 1 verifies whether a program is falsified once a day. The verification needs to be performed even in a case where an application executed by the microcomputer 1 is taken over by a malicious program.

In the following description, it is assumed that an application is a main function and a verification function of determining whether the application is taken over by a malicious program is an auxiliary function. In a case where the auxiliary function detects a sign of the malicious program, an action such as a complete stop or restart is taken in order to prevent a malfunction of the main function. In a case where the sign of the malicious program is not detected, the main function continuously executes measurement or control processing for a predetermined period. When the processing is over, a transition to a sleep state is performed and unnecessary power consumption is controlled. In order to control deterioration in quality of the measurement/control processing during operation of the main function, there is an aim to execute the verification function preferentially when the main function is in the sleep state. In order to prevent initialization processing from being executed each time the measurement/control processing is executed, a periodic reset of a battery life is not performed in a case where the malicious program is not detected.

The microcomputer 1 includes a CPU 2, a mask ROM 3, a secure timer 4, a state management controller 5, a bus monitoring controller 6, an SRAM 7, an instruction flash memory 8, a MAC generation management controller 9, a communication I/F 10, an antenna 11, and an internal bus 12. Note that the CPU 2, the mask ROM 3, the state management controller 5, the bus monitoring controller 6, the SRAM 7, the instruction flash memory 8, the MAC generation management controller 9, and the communication I/F 10 are connected to the internal bus 12. In order to perform an automatic memory transfer at the time of data reception inside the communication I/F 10, a bus master 13 by a direct memory access controller (DMAC) is included. The CPU 2 can also transfer transmitted/received data.

The CPU 2 is a processor that can execute various kinds of programs and is a so-called core processor. The CPU 2 realizes functions corresponding to the programs.

The mask ROM 3 a non-rewritable non-volatile memory. Contents of the mask ROM 3 are fixed when hardware of the microcomputer 1 is manufactured in a factory.

The secure timer 4 measure time, and outputs a secure interrupt request to the state management controller 5 when certain time elapses. That is, the secure interrupt request is requested by the secure timer 4. Note that an external device or the like may make the secure interrupt request in addition to the secure timer 4.

When the secure interrupt request is input, by detecting the sleep state of the CPU 2, the state management controller 5 manages a processing state of a secure interrupt executed by the CPU 2.

When the sleep state of the CPU 2 is detected, by monitoring the bus, the bus monitoring controller 6 detects fetch of a vector address of the secure interrupt by the CPU 2. The bus monitoring controller 6 includes a storage unit to store the vector address of the secure interrupt.

The SRAM 7 is a volatile memory. The SRAM 7 includes a general-purpose RAM 71 and a secure interrupt-dedicated RAM 72. The general-purpose RAM 71 functions as a region into which various kinds of programs are loaded. Also, the general-purpose RAM 71 functions as a buffer of user data transferred between the external device and the microcomputer 1, and stores general data that is used by the main function or the auxiliary function and that is, for example, a stack. Also, the general-purpose RAM 71 holds an interrupt vector. This interrupt vector is table information that holds an interrupt vector address of an execution program of each piece of interrupt processing.

The secure interrupt-dedicated RAM 72 functions as a region into which the secure interrupt processing is loaded. Moreover, the secure interrupt-dedicated RAM 72 also functions as a region to hold a processing result of the secure interrupt.

The instruction flash memory 8 is a non-volatile memory, and stores programs to realize various kinds of functions. Specifically, the instruction flash memory 8 stores a secure interrupt program 81 and an RTOS 82. The secure interrupt program 81 is a program to perform the secure interrupt processing. The RTOS 82 is a real-time OS. Note that the instruction flash memory 8 may store various kinds of other programs. Also, there is an embedded CPU that has a function of directly executing a program stored in a flash memory (execute in place (XIP) function). In this case, loading of a program into the general-purpose RAM 71 and the secure interrupt-dedicated RAM 72 is not necessary.

The MAC generation management controller 9 performs signature generation processing. The MAC generation management controller 9 has a storage unit to store a private key.

The antenna 11 is electrically connected to the communication I/F 10. The communication I/F 10 transmits/receives a radio signal via the antenna 11.

The communication I/F 10 is an interface device that performs communication with the external device. Also, the communication I/F 10 can transfer, to the CPU 2, a request received from the external device. The communication I/F 10 can buffer data, which is transmitted from the external device, to the SRAM 7 by the bus master 13.

Figure 2:
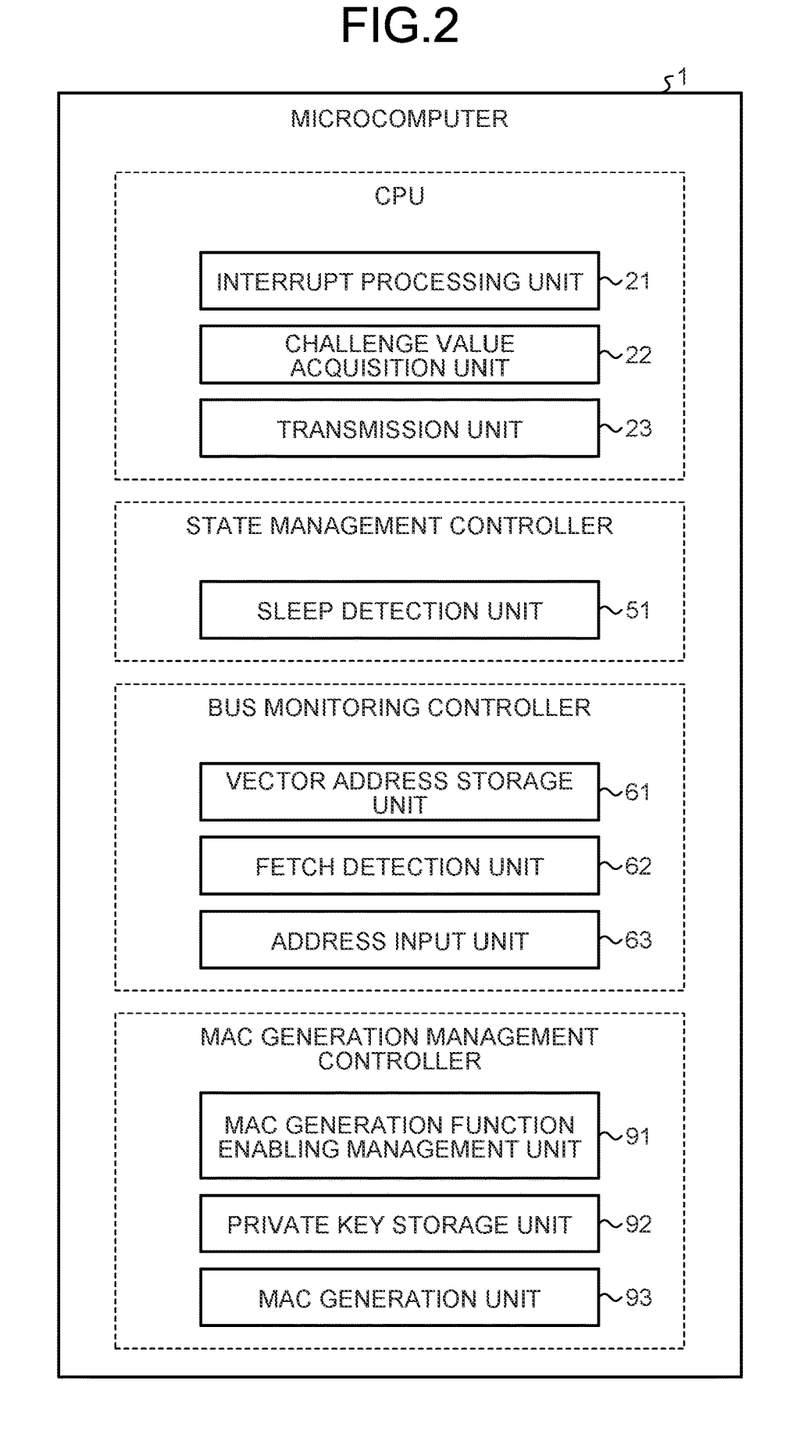
FIG. 2 is a block diagram illustrating an example of a functional configuration of the microcomputer according to the embodiment.

FIG. 2 is a block diagram illustrating an example of a function of the microcomputer 1 according to the embodiment. The microcomputer 1 includes an interrupt processing unit 21, a challenge value acquisition unit 22, and a transmission unit 23. The CPU 2 realizes the interrupt processing unit 21, the challenge value acquisition unit 22, and the transmission unit 23 by executing the RTOS 82, and programs operated on the RTOS 82.

Also, the microcomputer 1 includes a sleep detection unit 51. A logic circuit of the state management controller 5 realizes the sleep detection unit 51 by detecting previously-set secure interrupt condition including sleep signal detection.

Also, the microcomputer 1 includes a vector address storage unit 61, a fetch detection unit 62, and an address input unit 63. The vector address storage unit 61 is realized by a predetermined storage unit included in the bus monitoring controller 6. Also, a logic circuit of the bus monitoring controller 6 realizes the fetch detection unit 62 and the address input unit 63.

Also, the microcomputer 1 includes a MAC generation function enabling management unit 91, a private key storage unit 92, and a MAC generation unit 93. A logic circuit of the MAC generation management controller 9 realizes the MAC generation function enabling management unit 91 and the MAC generation unit 93. Also, the private key storage unit 92 is realized by a predetermined storage unit included in the MAC generation management controller 9. A message authentication code (MAC) represents a falsification verification tag by a hash or symmetric-key cryptography, and is generally used by being limited to an asymmetric-key signature in a case of being written as a signature. In the following, a part written as a MAC generation function is allowed to be replaced with the asymmetric-key signature in performance of the present embodiment. Specifically, the MAC generation function based on the private key can be read and applied as an asymmetric-key signature function, and a generated MAC can be read and applied as a signature.

When a secure interrupt request is received, an interrupt vector address of the program for the secure interrupt is acquired from the SRAM 7. The interrupt vector address is information indicating an address at which a program of interrupt is held, and is a so-called entry point.

Also, the interrupt processing unit 21 executes the secure interrupt processing on the basis of the input interrupt vector address, and outputs a result of the execution. The secure interrupt is interrupt processing to determine whether the RTOS 82 is in a secure state. The RTOS 82 being in the secure state means a state in which program falsification is not performed, and means that stack data is not destroyed, for example.

When transitioning to a non-secure mode after starting up in a so-called secure mode, the CPU 2 may not transition back to the secure mode at the time of the startup. In this case, there is an advantage that no attack is received even when there is vulnerability in secure firmware in the secure mode at the time of the startup. In this case, by performing the secure interrupt processing, the CPU 2 determines presence/absence of a sign of intrusion of unauthorized software via communication. As an example of the sign of the intrusion, there are destruction of the stack data, and the like.

The challenge value acquisition unit 22 acquires a challenge value from the external device. When the RTOS 82 is operated, the challenge value acquisition unit 22 acquires a random challenge value via the communication I/F 10 from the server device or the like that is the external device.

The transmission unit 23 performs transmission control of the random challenge value, the secure interrupt processing result, and the signature with respect to the external device via the communication I/F 10.

When the secure interrupt request is input, the sleep detection unit 51 determines whether the CPU 2 transitions to the sleep state. For example, by receiving a signal indicating that it is in the sleep state from the CPU 2, the sleep detection unit 51 determines that the CPU 2 transitions to the sleep state.

When detecting that the CPU 2 transitions to the sleep state, the sleep detection unit 51 outputs, to the bus monitoring controller 6, a signal indicating that the transition to the sleep state is performed. This signal indicating that the transition to the sleep state is performed is a signal indicating a data replacement request to the bus monitoring controller 6. Also, the state management controller 5 notifies the CPU 2 of the secure interrupt request.

The vector address storage unit 61 stores a vector address of the secure interrupt. For example, the bus monitoring controller 6 stores the vector address of the secure interrupt at the time of the startup of the microcomputer 1. Note that the vector address storage unit 61 may store the vector address of the secure interrupt in advance.

After the sleep state of the CPU 2 is detected, the fetch detection unit 62 detects fetch of the vector address of the secure interrupt.

When detecting the fetch of the vector address of the secure interrupt, the address input unit 63 inputs the vector address of the secure interrupt from the vector address storage unit 61 into the CPU 2. With this structure, an address of a secure interrupt processing program 81 which address is stored in the vector address storage unit 61 is read instead of the interrupt vector address requested by the CPU 2, and execution of the secure interrupt processing program 81 is started. By the present mechanism, in a case where the interrupt vector address is set in the SRAM 71 by a malicious program and contents thereof are a storage location of the malicious program, the malicious program is executed after the reception of the interrupt request. Generally, a CPU core has a plurality of interrupt vectors and a beginning address thereof can be freely set. However, a structure of fixing only a part of the interrupt vectors is often not included. The present application has an effect of satisfying both of flexibility in interrupt vector table setting and a request for security to fix a part of the interrupt vectors in an existing CPU core.

The MAC generation function enabling management unit 91 manages whether to enable the MAC generation function. The MAC generation function enabling management unit 91 performs control in such a manner as to enable the MAC generation function only at the time of the secure interrupt processing.

The private key storage unit 92 stores a private key for MAC generation (MAC key in the following). Since the MAC generation management controller 9 holds the MAC key, direct access to the MAC key by the secure interrupt processing and the RTOS 82 is prevented. Thus, the microcomputer 1 can strengthen isolation of the MAC key. The MAC generation unit 93 generates the MAC.

Figure 3:
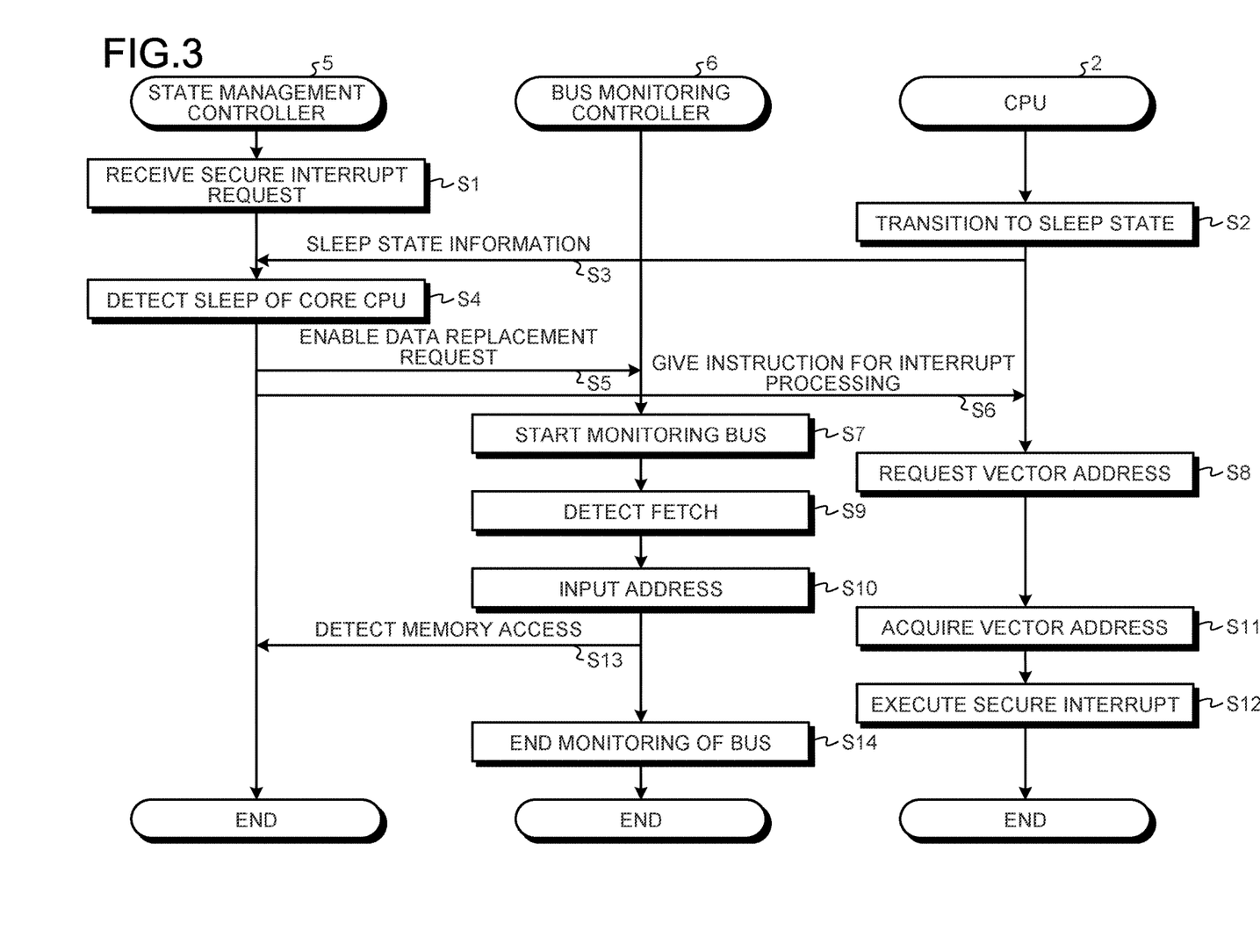
FIG. 3 is a sequence diagram illustrating an operation of secure interrupt processing by the microcomputer according to the embodiment.

Next, the secure interrupt processing will be described. FIG. 3 is a sequence diagram illustrating the secure interrupt processing by the microcomputer 1 according to the embodiment.

First, the state management controller 5 receives a secure interrupt request (S1). Then, the state management controller 5 waits until the CPU 2 transitions to the sleep state. Then, the CPU 2 transitions to the sleep state (S2), and the CPU 2 transmits a signal indicating that it is in the sleep state to the state management controller 5 (S3). The state management controller 5 detects that the CPU 2 is in the sleep state by acquiring the signal indicating that it is in the sleep state (S4).

Subsequently, the state management controller 5 transmits, to the bus monitoring controller 6, a signal indicating that a data replacement request is valid (S5). Also, the state management controller 5 transmits, to the CPU 2, a signal giving an instruction for the secure interrupt processing (S6).

When acquiring the signal indicating that the data replacement request is valid, the bus monitoring controller 6 starts monitoring the internal bus 12 (S7). Also, the CPU 2 gives the SRAM 7 an acquisition request for a vector address of a secure interrupt according to the signal giving the instruction for the secure interrupt processing (S8).

By detecting the acquisition request for the vector address, the bus monitoring controller 6 detects fetch of the vector address of the secure interrupt (S9).

The bus monitoring controller 6 inputs the vector address of the secure interrupt into the CPU 2 (S10). The CPU 2 acquires the vector address (S11), and executes the secure interrupt processing on the basis of the vector address (S12).

The bus monitoring controller 6 transmits, to the state management controller 5, a signal indicating that memory access is detected (S13), and ends the monitoring of the bus (S14).

Figure 4:
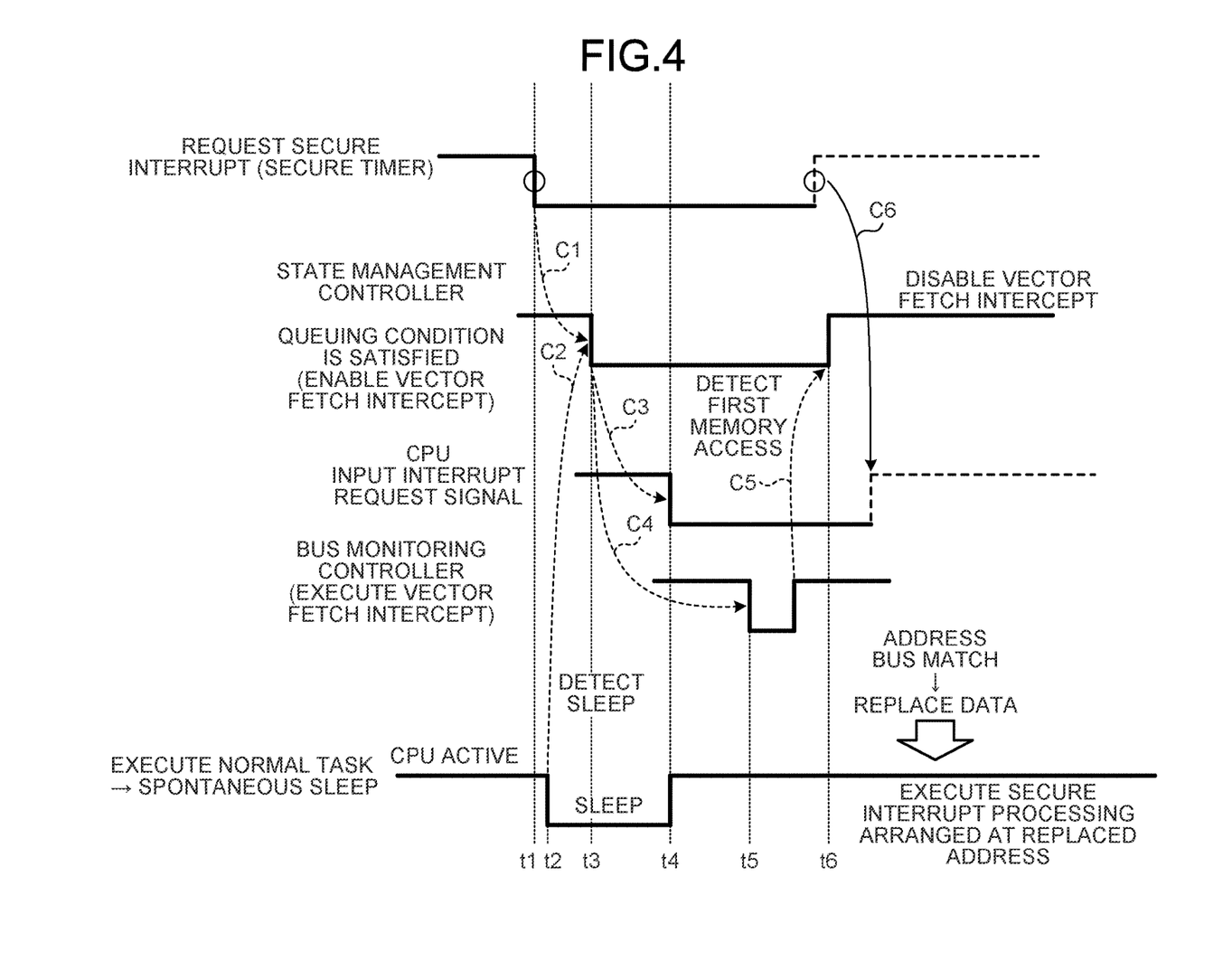
FIG. 4 is a view illustrating an example of operation timing and a flow of control signals in the secure interrupt processing by the microcomputer according to the embodiment.

Next, operation timing and a flow of control signals in the secure interrupt processing will be described. FIG. 4 is a view illustrating an example of the operation timing and the flow of the control signals in the secure interrupt processing by the microcomputer 1 according to the embodiment.

First, the secure timer 4 measures time, and outputs a signal C1 indicating the secure interrupt request to the state management controller 5 at timing t1 of the secure interrupt request. After the secure interrupt request is input, the state management controller 5 waits until the CPU 2 transitions to the sleep state (corresponding to S1). The state management controller 5 waits until condition of executing the secure interrupt processing (queuing condition) is met.

At t2, the CPU 2 transitions to the sleep state (corresponding to S2), and the CPU 2 transmits, to the state management controller 5, a signal C2 indicating that it is in the sleep state (corresponding to S3).

At t3, by acquiring the signal C2 indicating that it is in the sleep state, the state management controller 5 detects that the CPU 2 transitions to the sleep state (corresponding to S4). Accordingly, the state management controller 5 outputs, to the bus monitoring controller 6, a signal C4 indicating that the data replacement request is valid (corresponding to S5). The data replacement means processing of intercepting the fetch of the vector address. The bus monitoring controller 6 monitors the internal bus 12 when receiving the data replacement request from the state management controller 5 (corresponding to S7).

Also, at t3, the state management controller 5 transmits, to the CPU 2, a signal C3 giving an instruction for the secure interrupt processing (corresponding to S6).

At t4, when receiving the signal C3, the CPU 2 gives the SRAM 7 the acquisition request for the vector address of the secure interrupt (corresponding to S8).

At t5, the bus monitoring controller 6 detects fetch of the vector address of the secure interrupt by the CPU 2 (corresponding to S9). For example, the bus monitoring controller 6 checks a match between a lower address of a fetch destination and a secure interrupt number, and inputs the vector address of the secure interrupt into the CPU 2 (corresponding to S10 and S11).

The CPU 2 performs the secure interrupt processing on the basis of the vector address (corresponding to S12). In such a manner, the bus monitoring controller 6 replaces the vector address of the secure interrupt. Also, the CPU 2 performs the secure interrupt processing by using the replaced vector address. Thus, even when the vector address of the secure interrupt which address is stored in the SRAM 7 is falsified, the microcomputer 1 can cause the secure interrupt to be executed appropriately.

The bus monitoring controller 6 outputs a signal C5, which indicates first memory access and which is a signal indicating that the fetch of the vector address of the secure interrupt by the CPU 2 is detected (corresponding to S13), and ends the monitoring of the bus (corresponding to S14). Also, at t6, the state management controller 5 disables the data replacement request. In addition, the secure timer 4 outputs, to the CPU 2, a signal C6 indicating that the secure interrupt request is ended.

Figure 5:
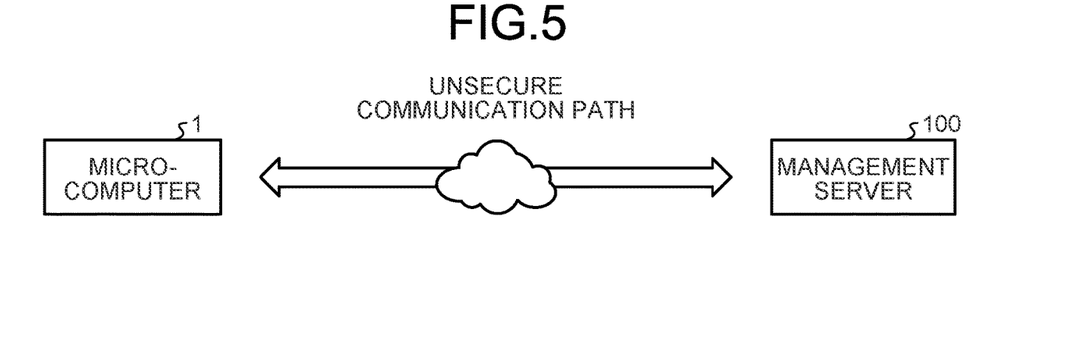
FIG. 5 is a system configuration diagram of execution of remote attestation according to the embodiment.

Next, cooperation of a remote attestation technology using the secure interrupt processing will be described. FIG. 5 is a system configuration diagram of execution of remote attestation according to the embodiment. It is assumed that a management server 100 and the microcomputer 1 transmit/receive information to/from each other via an unsecure communication path. The management server 100 is a server device that determines whether the microcomputer 1 is in an abnormal state in which the program of the microcomputer 1 is falsified, for example.

Figure 6:
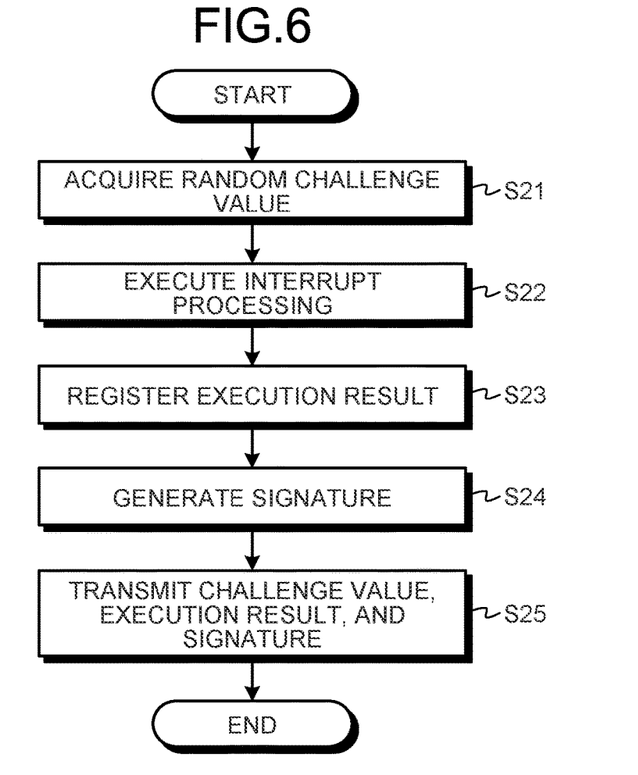
FIG. 6 is a flowchart illustrating an operation of the remote attestation according to the embodiment.

FIG. 6 is a flowchart illustrating an operation of the remote attestation according to the embodiment. It is assumed that the management server 100 gives a state checking request to the microcomputer 1 at predetermined timing. The management server 100 transmits a random challenge value to the microcomputer 1 at the time of the state checking request.

When the CPU 2 of the microcomputer 1 is causing the RTOS 82 to operate, the CPU 2 acquires the random challenge value and receives the state checking request via the communication I/F 10 (S21). The CPU 2 may hold this random challenge value, or may register the random challenge value into the SRAM 7.

When receiving the secure interrupt request by the secure timer 4 from the state management controller 5 after acquiring the random challenge value, the CPU 2 executes the secure interrupt processing (S22). In a period in which the secure interrupt processing is executed, the state management controller 5 transmits, to the MAC generation management controller 9, a signal indicating that the secure interrupt processing is being executed.

When acquiring the signal indicating that the secure interrupt processing is being executed, the MAC generation management controller 9 enables the MAC generation function. The CPU 2 registers a result of the secure interrupt processing into the secure interrupt-dedicated RAM 72 (S23), and instructs the MAC generation management controller 9 to perform MAC generation. Also, the MAC generation management controller 9 generates a MAC with respect to the result of the secure interrupt processing and the random challenge value by using the stored private key (S24). When checking completion of the MAC generation by the MAC generation management controller 9, the CPU 2 issues a secure interrupt ending instruction (interrupt restoration instruction), ends the secure interrupt processing, and transfers the control to the RTOS. On the basis of the signal from the state management controller 5, the MAC generation by the MAC generation management controller 9 is limited to when the secure interrupt processing is being performed. Thus, the MAC generation is not performed during execution of the RTOS after the secure interrupt is over, and MAC forgery by the malicious program is prevented.

After the secure interrupt is over, the transmission unit 23 executed as a part of the RTOS transmits the random challenge value, the result of the secure interrupt processing, and the MAC to the management server 100 via the communication I/F 10 (S25).

The management server 100 checks MAC verification and whether the random challenge value matches, and determines whether the result of the secure interrupt processing is normal. In a case where the MAC is used, it is assumed that the management server 100 shares a private key for the MAC with a device in advance.

In a case where the MAC matches as a result of the verification of the MAC and it is indicated that the result of the secure interrupt processing is normal, the management server 100 determines that abnormality is not generated in the microcomputer 1. On the other hand, in a case where the result of the secure interrupt processing, and the like cannot be received from the microcomputer 1, and a case where the random challenge value does not match, the management server 100 determines that the abnormality is generated in the microcomputer 1. Also, in a case where the MAC does not match as a result of the verification of the MAC, and a case where the result of the secure interrupt processing indicates the abnormality, the management server 100 determines that the abnormality is generated in the microcomputer 1.

In the above-described embodiment, a case where transition of the CPU 2 to the sleep state is set as condition of executing the secure interrupt processing has been described. However, another condition may be further added. For example, a stoppage of the bus master may be set as additional condition. Also, a stoppage of a subordinate CPU or DMA controller may be set as additional condition. This makes it possible for the CPU 2 to eliminate interference during execution of the secure interrupt processing.

For example, there may be a case where a function in which the subordinate CPU or DMA controller embedded in the communication I/F 10 becomes the bus master 13 and automatically transfers received data of communication to the SRAM 7 is included. There is a possibility that this function interferes with an operation by causing data contention with respect to the secure interrupt processing. Here, it is possible to eliminate the interference by stopping the operation of the bus master during execution of the secure interrupt processing with a stoppage of the secure interrupt processing being set as additional condition of starting the secure interrupt processing.

Also, in a case where the CPU 2 does not transition to the sleep state for a predetermined period after the secure interrupt request is input, the state management controller 5 may perform predetermined forced-shutdown processing. Also, the state management controller 5 may store information, which indicates that the forced shutdown is performed, into the secure interrupt-dedicated RAM 72, or the like.

In a case where a non-maskable interrupt of a case where a fatal fault is generated is generated during execution of the secure interrupt, the CPU 2 may record information indicating suspension into a predetermined register. For example, the interrupt processing unit 21 monitors an input line of the non-maskable interrupt. In a case where the non-maskable interrupt is asserted during execution of the secure interrupt, the interrupt processing unit 21 may suspend the secure interrupt processing regardless of a start of non-maskable interrupt processing.

In the above-described embodiment, a case where the microcomputer 1 includes the state management controller 5 and the bus monitoring controller 6 has been described.

However, a controller in which the state management controller 5 and the bus monitoring controller 6 are integrated may be included.

In the above-described embodiment, a case of determining falsification of a program in the secure interrupt processing has been described. However, the microcomputer 1 may detect a trouble of a motor.

According to the above-described embodiment, after the CPU 2 transitions to the sleep state, the bus monitoring controller 6 detects the fetch of the vector address of the secure interrupt, and inputs the vector address of the secure interrupt into the CPU 2.

Accordingly, the microcomputer 1 can securely execute important processing such as the secure interrupt since the bus monitoring controller 6 inputs the vector address of the secure interrupt into the CPU 2. In addition, the microcomputer 1 can also perform interrupt processing with an address corresponding to an address change by the user by using the address stored in the SRAM 7 as it is with respect to an address of other interrupt processing.

Depending on architecture of the CPU 2, a VTOR register in the CPU 2 holds an upper address of an interrupt vector table. It is not possible to detect a change in a VTOR from the outside of the CPU 2. In the above-described embodiment, the bus monitoring controller 6 checks a match between the lower address of the fetch destination and the secure interrupt number, and inputs the previously-stored vector address of the secure interrupt into the CPU 2. Thus, in the above-described embodiment, it is possible to appropriately determine a type of the interrupt regardless of the change in the VTOR. Also, without being affected by setting of the VTOR, the CPU 2 can appropriately perform the secure interrupt processing by using the input address.

The present embodiment is to provide a function of securely executing an auxiliary function, which is executed separately from a main function, in order to securely detect an abnormal operation in a case where there is vulnerability in the RTOS and the main function executed on the RTOS and a threat of the abnormal operation is assumed. The separation between the main function and the auxiliary function will be supplementally described. In a case where software vulnerability is included in communication processing of the main function, an unauthorized operation is caused from the outside via communication. As an example, there is an unauthorized rewrite of a function return address on a stack. There is a threat that data in a memory region not to be originally executed as a program is executed instead of an original execution flow of the program and the unauthorized operation is performed. Such a threat can be detected by a checking function with respect to a data structure in a stack region. However, in a case where the checking function is realized as a part of a main function program, there is a concern that execution of the checking function is bypassed and disabled by execution of the malicious program. Although it is natural that the unauthorized operation is generated in a case where the program of the main function is rewritten from any cause, the unauthorized operation may be also generated in a state in which the program of the main function is not rewritten. A sign of such an unauthorized operation varies depending on a device. In the present embodiment, detection processing is set as an auxiliary function program, whereby it is possible to securely perform the detection processing with respect to the unauthorized operation which processing is suitable for each device.

What is claimed is:

1. An information processing device comprising:
a processor;
a controller; and
a memory, wherein
the memory stores a vector address related to an interrupt request executed on condition that the processor is in a sleep state, and
the controller:
receives the interrupt request and detects that the processor transitions to the sleep state;
detects fetch of the vector address of the interrupt request after the sleep state of the processor is detected; and
inputs the vector address related to the interrupt request and stored in the memory into the processor in a case where the fetch of the vector address of the interrupt request is detected.

2. The information processing device according to claim 1, wherein the vector address related to the interrupt request is stored into the memory at time of startup of the information processing device.

3. The information processing device according to claim 1, wherein the interrupt request is requested by a timer.

4. The information processing device according to claim 1, wherein a stoppage of a bus master is set as additional condition of the interrupt processing.

5. The information processing device according to claim 1, wherein the controller performs forced-shutdown processing in a case where the processor does not transition to the sleep state for a predetermined period after receiving the predetermined interrupt request.

6. The information processing device according to claim 1, wherein the processor outputs a result of execution of predetermined interrupt processing, based on the vector address related to the interrupt request and input by the controller.

7. The information processing device according to claim 6, wherein the processor acquires a challenge value from an external device,
the controller generates a signature with respect to the result of the execution output from the processor, and the challenge value, and
the processor transmits the generated signature, the challenge value, and the result of the execution to the external device.

8. The information processing device according to claim 1, wherein the controller instructs the processor to perform interrupt processing after the sleep state of the processor is detected.

9. The information processing device according to claim 8, wherein after instructing the processor to perform the interrupt processing, the controller monitors a bus of the information processing device and detects the fetch of the vector address of the interrupt request.

10. The information processing device according to claim 9, wherein after inputting the vector address related to the interrupt request into the processor, the controller stops monitoring the bus of the information processing device.

11. A processing method executed by an information processing device including a processor, a controller, and a memory that stores a vector address related to an interrupt request executed on condition that the processor is in a sleep state, the method comprising:
receiving the interrupt request and detecting that the processor transitions to the sleep state;
detecting fetch of the vector address of the interrupt request after detecting the sleep state of the processor; and inputting the vector address related to the interrupt request and stored in the memory into the processor in a case where the fetch of the vector address of the interrupt request is detected.

12. The processing method according to claim 11, further comprising storing the vector address related to the interrupt request into the memory at time of startup of the information processing device.

13. The processing method according to claim 12, wherein the interrupt request is requested by a timer.

14. The processing method according to claim 11, wherein a stoppage of a bus master is set as additional condition of the interrupt processing.

15. The processing method according to claim 11, wherein forced-shutdown processing is performed in a case where the processor does not transition to the sleep state for a predetermined period after a predetermined interrupt request is received.

16. The processing method according to claim 11, wherein a result of execution of predetermined interrupt processing is output based on the vector address related to the interrupt request and input into the processor.

17. The processing method according to claim 16, further comprising:
acquiring a challenge value from an external device;
generating a signature with respect to the result of the execution of the interrupt processing and the challenge value; and
transmitting the generated signature, the challenge value, and the result of the execution to the external device.

18. The processing method according to claim 11, further comprising instructing the processor to perform interrupt processing after the sleep state of the processor is detected.

19. The processing method according to claim 18, wherein a bus of the information processing device is monitored and the fetch of the vector address of the interrupt request is detected after the processor is instructed to perform the interrupt processing.

20. The processing method according to claim 19, wherein monitoring the bus of the information processing device is stopped after the vector address related to the interrupt request is input into the processor.

* * * * *